United States Patent
Leib et al.

(10) Patent No.: US 7,392,046 B2
(45) Date of Patent: Jun. 24, 2008

(54) METHOD AND APPARATUS FOR AUTOMATIC DIAGNOSIS AND RESOLUTION OF WIRELESS NETWORK MALFUNCTIONS

(75) Inventors: Evgeny Leib, Kfar Saba (IL); Joshua Glazer, Ra'anana (IL); Netzer Shlomai, Ra'anana (IL)

(73) Assignee: Microsoft Corporation, Redmond, WA (US)

( * ) Notice: Subject to any disclaimer, the term of this patent is extended or adjusted under 35 U.S.C. 154(b) by 155 days.

(21) Appl. No.: 10/885,017

(22) Filed: Jul. 7, 2004

(65) Prior Publication Data

US 2005/0176418 A1    Aug. 11, 2005

Related U.S. Application Data

(60) Provisional application No. 60/542,855, filed on Feb. 10, 2004.

(51) Int. Cl.
*H04Q 7/20*    (2006.01)
(52) U.S. Cl. .................. 455/423; 455/424; 455/425; 455/67.11
(58) Field of Classification Search .......... 455/423, 455/424, 425, 67.11, 67.14
See application file for complete search history.

(56) References Cited

U.S. PATENT DOCUMENTS

| | | | | |
|---|---|---|---|---|
| 6,298,233 | B1 * | 10/2001 | Souissi et al. | 455/423 |
| 6,910,159 | B2 * | 6/2005 | Phillips et al. | 714/38 |
| 6,915,128 | B1 * | 7/2005 | Oh | 455/424 |
| 2001/0016489 | A1 * | 8/2001 | Haymes et al. | 455/423 |
| 2004/0058651 | A1 * | 3/2004 | Ross et al. | 455/67.11 |
| 2004/0127239 | A1 * | 7/2004 | Cho | 455/466 |
| 2004/0193709 | A1 * | 9/2004 | Selvaggi et al. | 709/224 |
| 2004/0214566 | A1 * | 10/2004 | Suzuki et al. | 455/423 |
| 2004/0255192 | A1 * | 12/2004 | Watanabe et al. | 714/25 |
| 2005/0135236 | A1 * | 6/2005 | Benson et al. | 370/225 |

\* cited by examiner

*Primary Examiner*—Erika A Gary
(74) *Attorney, Agent, or Firm*—Lee & Hayes, PLLC

(57) ABSTRACT

A method and apparatus related to the automatic diagnosis and resolution of wireless network malfunctions. A network malfunction diagnosis is made by comparing information gathered from a plurality of wireless network components to a predefined set of rules. The comparison may be performed using comprehensive query language capabilities. Once a network malfunction is detected, a malfunction report is generated and the malfunction may be automatically repaired

49 Claims, 5 Drawing Sheets

| Rule | Item |
|------|------|
| Wireless connection without WEP or VPN. | Your wireless Internet connection is not secured |
| WEP is configured AND Sending public key automatically. | Wireless access point automatic WEP key scan |
| Wireless connection detected AND router/AP management interface uses default password. | Change router/AP password |
| Internet connection using wireless AND using one of the common SSID. | Change access point SSID |
| Internet connection using wireless AND using SSID broadcast. | Change SSID to non-broadcast |
| More than one computer is connected to your access point. | Other computers are connected to your access point |
| More than one access points are available AND there is access point with more power. | Locate best wireless access point |
| The wireless signal is less than 25% | Improve your wireless signal access point |
| Windows XP AND the "Check a remote computer for scheduled tasks before any access to shared folder" option is enabled (Registry). | Improve network connection speed |
| LAN connection AND wireless connection are activated | Disable the wireless connection |
| Printer installed without printer sharing AND other computers are connected to the Network. | Share your printer |

*FIG. 4*

METHOD AND APPARATUS FOR AUTOMATIC DIAGNOSIS AND RESOLUTION OF WIRELESS NETWORK MALFUNCTIONS

CROSS-REFERENCES TO RELATED APPLICATIONS

This application is an application filed under 35 U.S.C. § 111(a), claiming benefit pursuant to 35 U.S.C. § 119(e) of the filing date of the Provisional Application Ser. No. 60/542,855 filed on Feb. 10, 2004, pursuant to 35 U.S.C. § 111(b). The Provisional Application Ser. No. 60/542,855 is herein incorporated by reference in its entirety.

BACKGROUND OF THE INVENTION

1. Technical Field of the Invention

Apparatuses and methods consistent with the present invention relate generally to computer network maintenance apparatuses and methods for automatically diagnosing and repairing malfunctions of wireless networks.

2. Description of the Related Art

Recent market research has shown that consumer demand for wireless home networking is driven by the rapid growth of the Internet, high-speed Internet connections and multiple household personal computers (PCs). Wireless networking is one of several ways to connect the computers in a public environment. Wireless networks are designed to allow PCs, peripheral devices, and other consumer electronic devices to share voice and data via a single network.

Wireless networks operate in a client/server model or a point-to-point model. In a client/server model, network components have an access point, which is a wired controller that receives and transmits data to the wireless adapters installed in each network device. In a point-to-point model, a network component communicates directly with every component of the network. Currently, there are four types of wireless networks, comprising Bluetooth networks, infrared data association (IrDA) networks, shared wireless access protocol (SWAP) networks and Wi-Fi networks. The SWAP and the Wi-Fi networks are widely available and are expected to provide the need for high-speed data networks between computers. Both SWAP and Wi-Fi specifications rely on the IEEE 802.11 standard.

Setting up a wireless network requires users to provide information about how to configure the computers, the routers, the firewalls, the Ethernet network addresses, file sharing, printer sharing, Internet connection sharing and other network configuration information. Specifically, to configure a wireless network, a user has to provide a plurality of network settings to enable the proper operation of the network. These settings may comprise the wireless network policy, the type connection type of the wireless network (ie., an access point or a point-to-point), the security level, the wireless network key to be used and other settings. As an ordinary user generally does not have sufficient networking background and is not very familiar with various computer concepts, establishing a wireless network requires support from expert technical personnel.

The complexity of wireless network maintenance introduces even more challenging difficulties. Generally, malfunctions in system network can be a result of various sources, such as improper configurations, malfunctions in one or more network components, malfunctions at the network operator or a combination thereof. Since, a system network is a collection of many network components, provided by different vendors, the ability to diagnose the source of a malfunction by an ordinary user is almost impossible.

Failures experienced by a user are often addressed by having the user call the network operator's technical support and attempt to describe the problem. The technical support personnel then attempts to guide the user through various network tests and settings of the user's network equipment. This is done typically in order to assess the problem more definitively than to rely on the problem description provided by the user. This process is neither effective nor efficient, as users usually report irrelevant effects or symptoms that mask the true problem.

There are diagnostic tools allowing technical support personnel to perform remote testing directly on a user's equipment, for example a user's PC, from a user's perspective. Such tools significantly improve the efficiency and effectiveness of the network troubleshooting process. However, such diagnostic tools still require the intervention of technical support personnel for diagnosing failures and for repairing them. Furthermore, these diagnostic tools are not designed for detecting failures that commonly occur in wireless networks.

SUMMARY OF THE INVENTION

The present invention has been made in view of the above circumstances and the exemplary and non-limiting embodiments of the present invention may overcome the above disadvantages and other disadvantages not described above. However, the present invention is not required to overcome the disadvantages described above, and the exemplary and non-limiting embodiments of the present invention may not overcome any of the problems described above.

One aspect of the present invention relates to a method for automatic diagnosis and resolution of malfunctions in a wireless network. Configuration information that describes the malfunctioning wireless network is collected. Preferably, but not necessarily, the configuration information can be a list of values for the configurable parameters associated with each device connected to the wireless network, or it can be topology information for the wireless network. The collected configuration information is iteratively diagnosed with a set of test rules to determine if any of the test rules are satisfied. Preferably, but not necessarily, a test rule recites a predefined condition, which is then compared to the configuration information. If a test rule is satisfied, i.e., a malfunction is diagnosed, a malfunction report can be generated.

A second aspect of the present invention relates to a computer program product for automatic diagnosis and resolution of malfunctions in a wireless network. The computer program product comprises software instructions for enabling a computer system to perform predetermined operations, and further comprises a computer readable medium bearing the software instructions. The software instructions command the collection of configuration information that describes the malfunctioning wireless network. Preferably, but not necessarily, the configuration information can be a list of values for the configurable parameters associated with each device connected to the wireless network, or it can be topology information for the wireless network. The software instructions iteratively diagnose the collected configuration information with a set of test rules to determine if any of the test rules are satisfied. Preferably, but not necessarily, a test rule recites a predefined condition, which is then compared to the configuration information. If a test rule is satisfied, i.e., a malfunction is diagnosed, the software instructions command the generation of a malfunction report.

A third aspect of the present invention relates to a checkup apparatus for automatic diagnosis and resolution of malfunctions in a wireless network. A means for collection collects of configuration information that describes the malfunctioning wireless network. Preferably, but not necessarily, the configuration information can be a list of values for the configurable parameters associated with each device connected to the wireless network, or it can be topology information for the wireless network. A means for iterative diagnosis by application of a set of test rules iteratively diagnoses the collected configuration information with a set of test rules to determine if any of the test rules are satisfied. Preferably, but not necessarily, a test rule recites a predefined condition, which is then compared to the configuration information. The means for iterative diagnosis determines if at least one of the test rules is satisfied. If a test rule is satisfied, i.e., a malfunction is diagnosed, a means for generating produces a malfunction report regarding the satisfied test rule or rules.

BRIEF DESCRIPTION OF THE DRAWINGS

The aspects of the present invention will become more apparent by describing in detail exemplary, non-limiting embodiments thereof with reference to the accompanying drawings. In the drawings:

FIG. 4 is an exemplary, non-limiting list of check rules used for automatic diagnosing and repairing wireless network malfunctions.

DESCRIPTION OF EXEMPLARY EMBODIMENTS

A detailed description of exemplary embodiments will now be given referring to the accompanying drawings.

Figure 1:
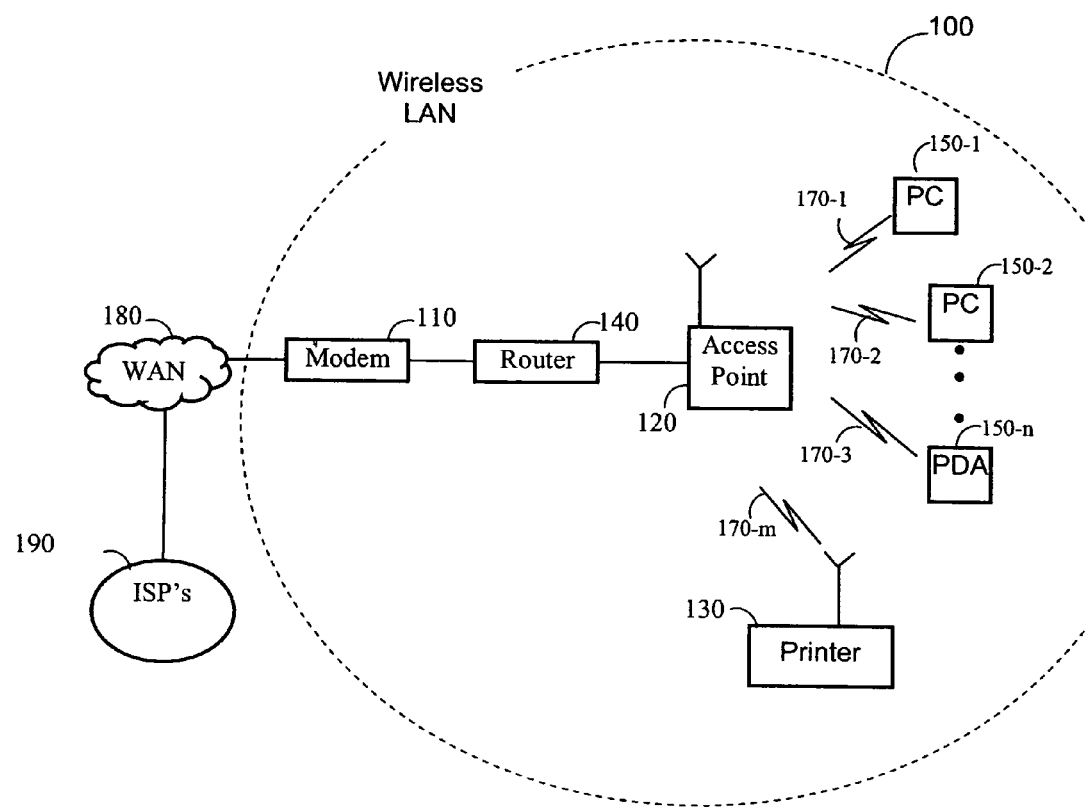
FIG. 1 is an illustration of a typical wireless communication network.

Referring to FIG. 1, an illustration of a typical wireless communication network 100 is shown. The wireless communications network 100 comprises a router 140, an access point 120, a modem 110 coupled to router 140, and a plurality of portable wireless devices 150-1, 150-2, 150-n. The wireless devices 150-1, 150-2, 150-n may be, but are not limited to, personal digital assistants (PDAs), personal computers, handheld computers, notebook computers, mobile phones or any other type of handheld or personal wireless electronic device from which it may be desired to communicate with another device or another computer network. The wireless communications network 100 further comprises a network printer 130 that is shared among all wireless devices 150. The access point 120 is coupled to router 140. The combination of the access point 120 and the router 140 allows providing network services to wireless devices 150-1, 150-2, 150-n. The connection between printer 130 and wireless devices 150 is formed through access point 120, where the connection is a wireless signal, e.g., an infrared signal. It should be noted that, while a single access point 120 and a single router 140 are shown, that a plurality of each are also possible in the wireless communications network 100.

The wireless devices 150-1, 150-2, 150-n are connected to respective proximally located beacons 170-1 through 170-m. A single device 150 may communicate with multiple beacons as it moves, and vice versa, a single beacon 170 may communicate with multiple devices in its vicinity. The beacons 170-1 through 170-m are independently capable of transmitting wireless signals, such as radio frequency (RF) signals, infrared signals, visible light signals or other signals. The wireless devices 150, 150-1, 150-n are connected to an Internet service provider (ISP) 190 through a wide area network (WAN) 180. In one configuration of the wireless communications network 100, the connection to WAN 180 may be established through a firewall and a proxy server. In another configuration, the wireless communications network 100 can be a wireless local area network (WLAN), such as those based on the IEEE 802.11 standard, Bluetooth or infrared links.

The wireless communications network 100 may be operated in any area providing various resources available for wireless access. Such an area may be located in an airport, a food-service business (i.e., a coffee shop), a business resource center of a hotel, a museum, a house, etc.

A checkup agent (not shown) installed in one or more of wireless devices 150. The checkup agent is capable of executing all the activities related to diagnosing failures, repairing failures, configuring the various components of the wireless communications network 100 and other activities allowing the proper functionality of the wireless communications network 100. All of these activities are described in greater detail below.

In an exemplary embodiment, the checkup agent automatically configures a new wireless device 150 with the network's parameters and settings of the wireless communications network 100. Specifically, upon entry to a wireless communication area, a user having the checkup agent selects a discovery request provided by the checkup agent. As a result, the checkup agent responds by obtaining a listing of available resources in the wireless communication area by using a network discovery protocol by way of wireless signals. Once a user selects the wireless resources for communication, the checkup agent detects the network's configurations required to establish an appropriate connection with the selected resource. Subsequently, the checkup agent automatically sets up the wireless device 150 according to the required wireless network settings and security level.

Figure 2:
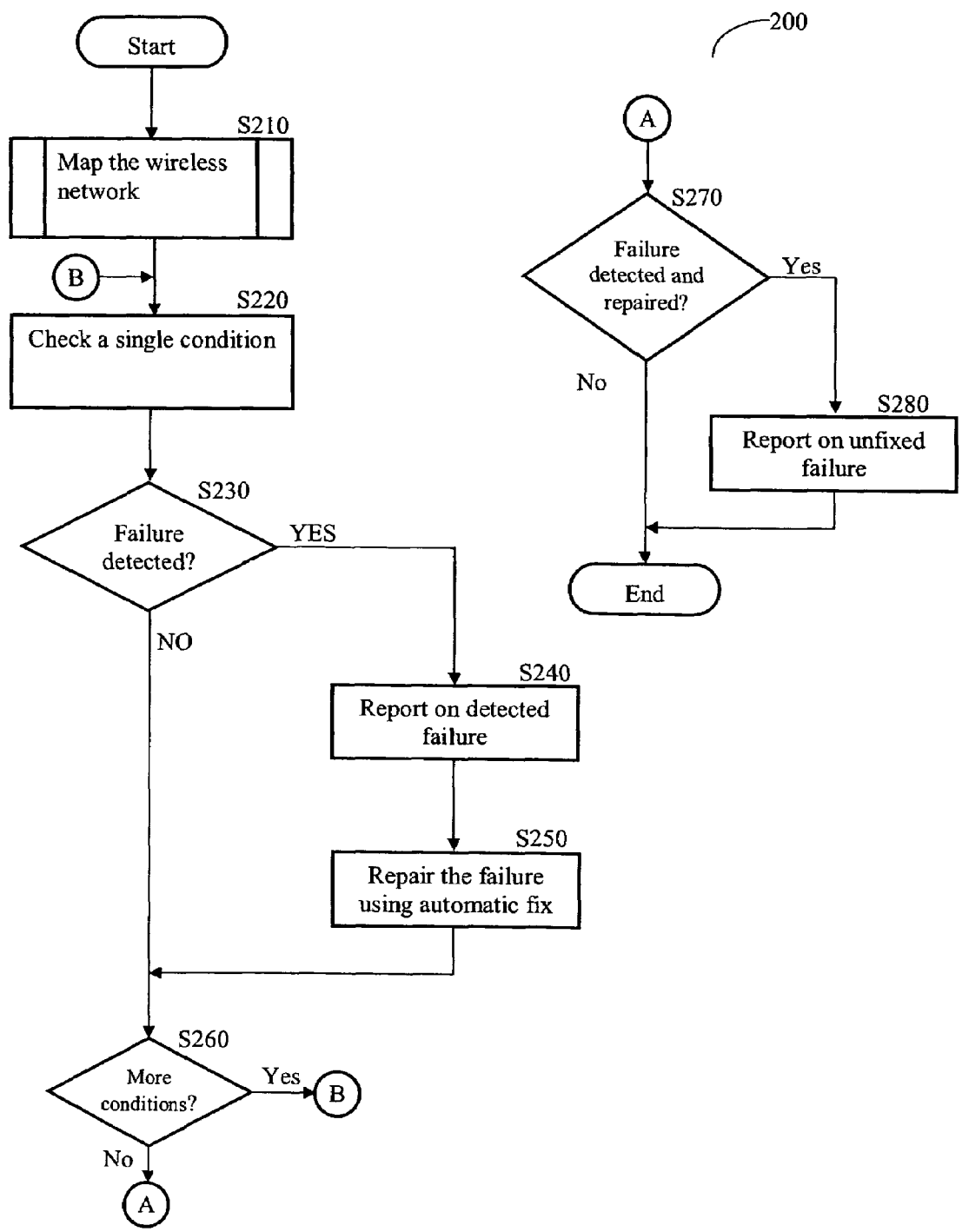
FIG. 2 is an exemplary, non-limiting flowchart describing the method for automatic diagnosing and repairing wireless networks malfunctions.

Referring to FIG. 2, a non-limiting flowchart 200 describing the method for automatically diagnosing and repairing wireless networks malfunctions is shown. The checkup agent installed in at least one of the wireless network components utilizes the present invention. The checkup agent can be activated by the user or can be activated by responding to one or more triggers defined by the user. For example, the checkup agent may be activated of if the amplitude of a received wireless signal is too low. At S210, once the checkup agent is activated to diagnose network malfunctions, a procedure for mapping the wireless communications network is applied. The network mapping procedure collects information regarding the network topology and topology data, which is then used for diagnosing failures. Specifically, the network mapping procedure discovers all the IP devices in the wireless communications network, as well as the networking names and the operating system (OS) of each of the discovered IP devices. The network mapping procedure is described in greater detail below. At S220, a series of predefined rules are checked for the purpose of diagnosing failures in the wireless network. A different rule is chosen each time processing reaches this step, ensuring that eventually all the rules at this series of predefined rules will be checked. Each rule is designed to check a different portion or a different functionality of the wireless network. Specifically, a rule determines whether at least one predefined condition related to the state of one or more network components is satisfied. The determination is made using network information gathered by the network mapping procedure or information gathered using a diagnose engine. A condition may be, but is not limited to, a standard query language (SQL) query, an extensible markup language (XML) query or any other query language expressions. For example, the following rule's condition is a SQL query that checks if the wireless network comprises at least one router having the WirelessEnabled and SSIDBroadcast parameters in a "true" value. If both parameters are set to a "true" value then the rule's condition is satisfied.

(SELECTE Count (*) FROM Routers.Routers
WHERE WirelessEnabled=true AND
SSIDBroadcast=true)>0

A non-limiting list of rules is provided in FIG. 4. At S230, a check is performed to determine if the condition was satisfied, i.e., if a failure is detected. If a failure is detected, the execution continues at S240 where the failure is reported to the user; otherwise, execution continues at S260. At S250, the detected failure is automatically repaired using a predefined fix that handles the detected failure. This fix comprises a set of commands to be executed by the checkup agent to repair the failure. For example, a fix for a failure diagnosed using the condition described above is to change the setting of the SSIDBroadcast to a "false" value. This can be done, for example, by using a unified setting interface (USI) disclosed in Provisional Application Ser. No. 60/545,935 and assigned to the common assignee. If user intervention is required to repair the failure (e.g., to plug-in a network cable), then the user is guided with the necessary actions to be performed to fix the failure. At S260, a check is performed to determine if there are more rules to be tested, and if so the execution continues with S220. If no more rules are to be tested, the execution continues with S270 where it is checked if a failure was detected and repaired. If the method fails in diagnosing the malfunction of the wireless network or fails to repair a detected malfunction, then at S280 a report, describing the malfunction and its symptoms, is generated and sent to the ISP. This report allows the ISP to develop new rules and new fixes. Furthermore, if a service call is deemed necessary to repair the failure, the technical support personnel would have all the details to diagnose and repair the problem correctly. This would reduce the total time spent by the technical support personnel on a service call. It should be appreciated by a person skilled in the art that the method described herein allows network providers and network operators (e.g., ISPs, cable service providers, and DSL service providers) to provide an effective and efficient customer service comprising timely and cost-effective resolution of problems experienced by their respective subscribers.

Figure 3:
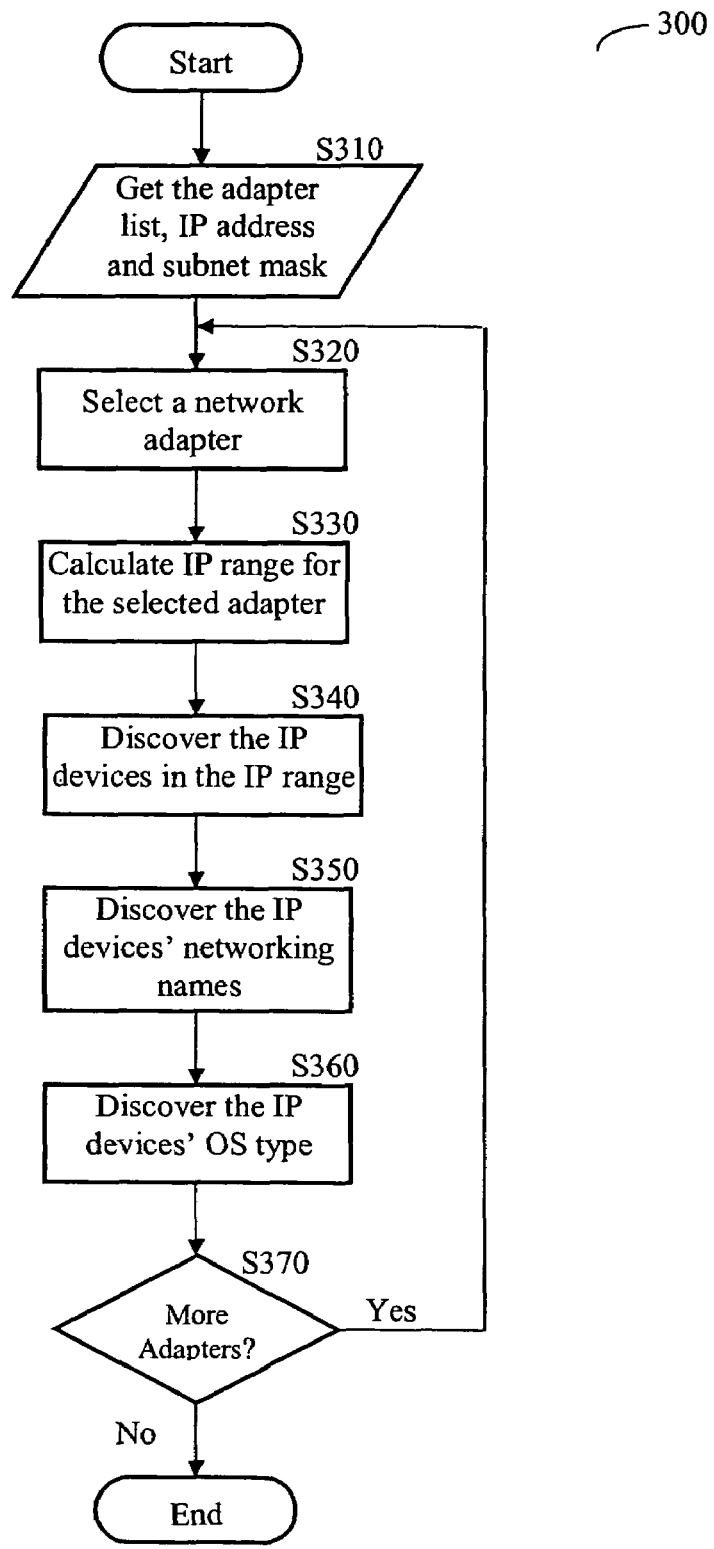
FIG. 3 an exemplary, non-limiting flowchart describing the network mapping procedure.

Referring to FIG. 3, an exemplary, non-limiting flowchart 300 describing the network mapping procedure is shown. As described above, the network mapping procedure discovers all IP devices in the wireless network, in addition to the networking name and the operating system (OS) of each discovered IP device. An IP device is a network component that communicates using an IP address. At S310, the procedure gets a list of network adapters (hereinafter the "adapter list") installed in the wireless network, and the IP address and the subnet mask of each adapter. At S320, a single network adapter from the adapter list is selected. A different network adapter is chosen each time during the network mapping process, ensuring that eventually all the adapters at this list are handled. At S330, the IP range for the selected network adapter is calculated. The calculation is performed using the IP address and the subnet mask of the selected network adapter. At S340, an address resolution protocol (ARP) query is sent to each IP address in the IP range calculated for the selected network adapter. The ARP query is used for the purpose of mapping IP network addresses to the hardware addresses used by a data link protocol, e.g., a media access layer (MAC) address. Subsequently, all the ARP replies that are sent, from the IP devices in the IP range, are collected. Each IP device that replies to the ARP query is considered as discovered. At S350, a NetBios request is sent to each of the discovered IP devices. An IP device replies to the NetBios request with its networking name. The procedure waits a predefined amount of time to receive the replies from all IP devices discovered at S340. At S360, an Internet control message protocol (ICMP) request is sent to each of the discovered IP devices. An IP device replies to the ICMP request with its operating system, e.g., Windows® or Unix®. The procedure waits a predefined amount of time to receive the replies from all IP devices discovered at S340. At S370, a check is performed to determine if all network adapters in the adapter list were handled, and if so the execution terminates; otherwise, execution continues at S320.

In an exemplary embodiment, the network mapping procedure generates and provides graphical representation of the network topology and the information received from the discovered IP devices.

Figure 5:
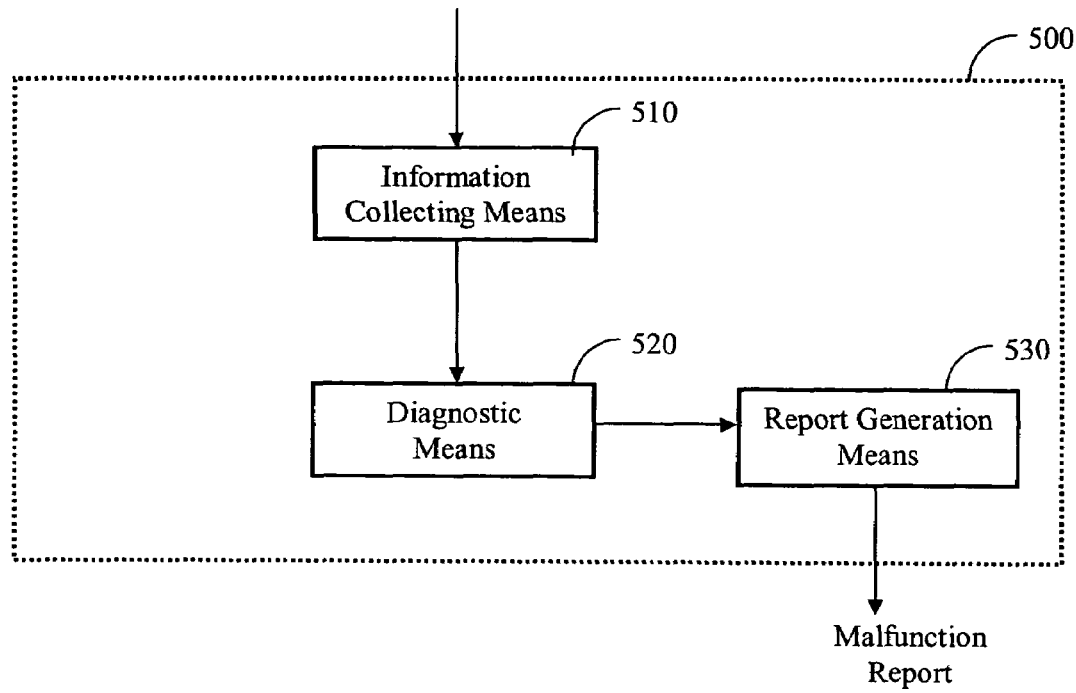
FIG. 5 is an exemplary, non-limiting diagram of a checkup agent.

Referring to FIG. 5, an exemplary and non-limiting embodiment of the checkup agent 500 is shown. The checkup agent 500 may comprise information collecting means 510, a diagnostic means 520 and a report generation means 530. The information collecting means 510 is connected to the diagnostic means 520 and is capable of collecting configuration information and topology data of a plurality of wireless devices connected in the wireless network. The diagnostic means 520 accesses a rules library and tests the collected configuration information and/or topology data against one or more selected set of rules retrieved from the rules library. The rules library comprises a list of test rules to be tested by the diagnostic means 520, and may comprise a portion of the diagnostic means 520. The diagnostic means 520 can be implemented in software, hardware, firmware or various combinations thereof. The diagnostic means 520 will generates an error message if one or more test rules are satisfied. The report generation means 530 generates a malfunction report based on the error message (or messages) received from the diagnostic means 520. As discussed above with reference to FIG. 3, the malfunction report can be forwarded to ISP personnel or other technicians for diagnostic purposes. The information collecting means 510, the diagnostic means 520 and the report generation means 530, as well as the rules library, can be implemented in software, hardware, firmware or various combinations thereof.

Figure 6:
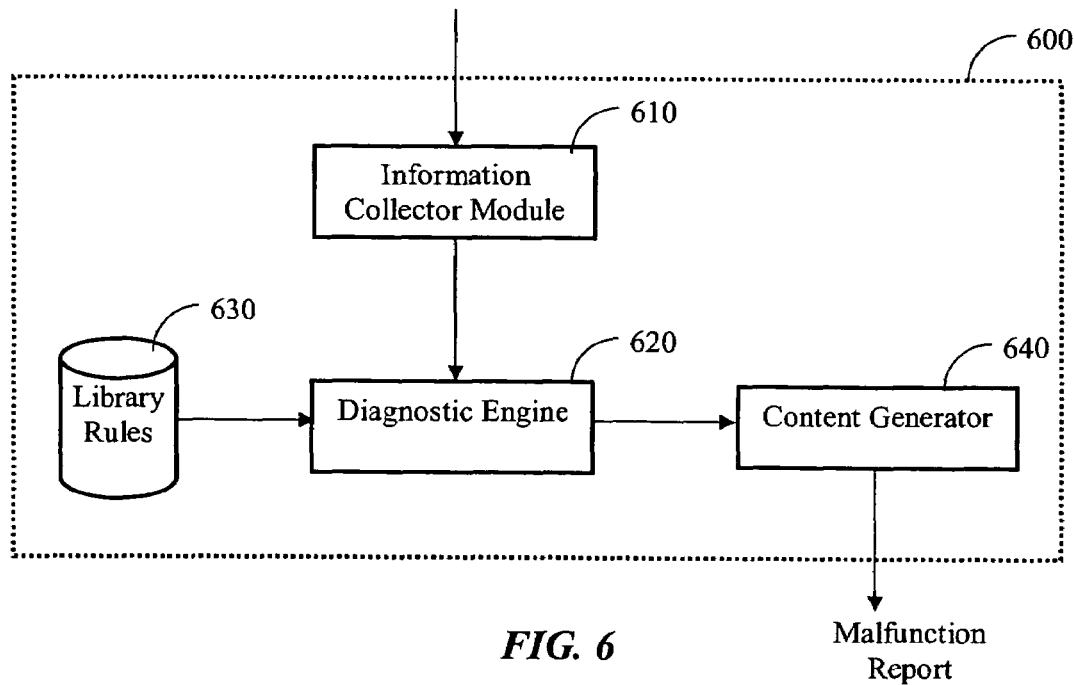
FIG. 6 is another exemplary, non-limiting diagram of a checkup agent.

Referring to FIG. 6, another exemplary and non-limiting embodiment of the checkup agent 600 is shown. The checkup agent 600 may comprise an information collector module 610, a diagnostic engine 620, a rules library 630 and a content generator 640. The information collector module 610 is connected to the diagnostic engine 620 and is capable of collecting configuration information and topology data of a plurality of wireless devices connected in the wireless network. The rules library 630 comprises a list of test rules to be tested by diagnostic engine 620. The rules library 630 is capable of being updated by local access thereto or via remote access. The diagnostic engine 620 accesses the rules library 630 and tests the collected configuration information and/or topology data against one or more selected set of rules retrieved from the rules library 630. The diagnostic engine 620 will generates an error message if one or more test rules are satisfied. The content generator 640 generates a malfunction report based on the error message (or messages) received from the diagnostic engine 620. As discussed above with reference to FIG. 4, the malfunction report can be forwarded to ISP personnel or other technicians for diagnostic purposes. The information collector module 610, the diagnostic engine 620, the rules library 630 and the content generator 640 can be implemented in software, hardware, firmware or various combinations thereof.

The exemplary embodiments can be implemented in software, hardware, firmware or various combinations of software with firmware or hardware In an embodiment, the elements are implemented in software that is stored in a memory and that configures and drives a digital processor situated in the respective wireless device. The software can be stored on any computer-readable media for use by or in connection with any suitable computer-related system or method. It will be appreciated that the term "predetermined operations" and the term "computer system software" mean substantially the same thing for the purposes of this description. It is not necessary that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may comprise a diskette, a tape, a compact disc, an integrated circuit, a cartridge, or any other similar media useable by computers. For example, to distribute computer system software, the supplier might provide a diskette. More specific examples of computer-readable media would comprise a portable computer diskette (magnetic), a random access memory (RAM) (magnetic), a read-only memory (ROM) (magnetic), an erasable programmable read-only memory (EPROM or Flash memory) (magnetic), and a portable compact disc read-only memory (CD-ROM).

Although computer system software might be "written on" a diskette or, "stored in" an integrated circuit, it will be appreciated that, for the purposes of this discussion, the computer usable media will be referred to as "bearing" the instructions for performing the predetermined operations. Thus, the term "bearing" is intended to encompass the above and all equivalent ways in which instructions for performing predetermined operations are associated with a computer usable media.

Therefore, for the sake of simplicity, the term "program product" is hereafter used to refer to a computer useable media, as defined above, which bears instructions for performing predetermined operations in any form.

In an exemplary embodiment, the checkup agent and the methods described herein can be operated to diagnose and repair malfunctions in digital home networks. Digital home networks can comprise information devices (e.g., a personal computer, a fax machine, a scanner, a printer), audio visual devices (e.g., a television, a set-top box, a DVD, a VCR, an audio system, a camcorder, a game system), control devices (e.g., a coffee maker, a refrigerator, a washing machine, a microwave oven, a camera) and dummy devices (e.g., a remote controller, an interphone, a sensor, a lighting device). These devices are connected to a communication media, comprising, but not limited to, a telephone line, a wireless LAN, a Bluetooth network, USB network, an IEEE 1394 network and a power line. In an exemplary embodiment, the checkup agent is installed in one of the network components (e.g., in a personal computer) and acts as a centric diagnosis system that allows the automatic setup of the home networks and the automatic detection and repairing of malfunctions. The centric diagnosis agent further provides technical support personnel a map of the home network, i.e., an intuitive graphical view of the home network architecture and components. This allows the technical support personnel to easily assist users in solving problems that cannot be repaired by the checkup agent.

While only exemplary embodiments have been specifically described herein, it is contemplated that numerous modifications may be made to the exemplary embodiments of the invention without departing from the spirit and scope of the exemplary embodiments of the present invention as defined in the following claims. Further, acronyms are used merely to enhance the readability of the specification and claims. It should be noted that these acronyms are not intended to lessen the generality of the terms used and they should not be construed to restrict the scope of the claims to the exemplary embodiments described therein.

What is claimed is:

1. A method for automatic diagnosis and resolution of at least one malfunction of a computer wireless network, said method comprising:
via a checkup agent on one or more of a plurality of wireless devices:
configuring automatically a new wireless device with a set of particular parameters and settings of the wireless network upon a joining of said device to said wireless network, wherein the joining comprises:
the checkup agent providing at least one discovery request;
receiving from the new wireless device a selection of one discovery request such that:
in an event that the discovery request is presented to a user via a user interface, facilitating entry of the user's selection;
in an event that the discovery request is configured to be selected automatically, responsive to a predetermined triggering event, effecting the selection;
responsive to the selection, the checkup agent utilizing a wireless discovery protocol via wireless signals;
obtaining a listing of available resources within a wireless communication area;
communicating the listing of available resources to the user of the new wireless device via the new wireless device;
causing the user of the new wireless device to select at least one available resource;
detecting network configuration information for connecting to the selected resource, wherein network configuration information comprises:
network settings associated with the selected resource; and
a security level associated with the selected resource;
collecting configuration information of said computer wireless network, wherein the computer wireless network comprises at least an access point and a plurality of wireless devices, and wherein the configuration information is collected for each wireless device;
iteratively diagnosing said collected configuration information with a set of test rules to determine if at least one of said test rules is satisfied; and generating a malfunction report if at least one of said test rules is satisfied.

2. The method of claim 1, wherein said method further comprises repairing the malfunction of a respective satisfied test rule, wherein the repairing is accomplished via a unified setting interface (USI) such that:
in an event that no user intervention in required to effect the repairing, via the USI the fix is performed;
in an event that user intervention is required to effect the repairing, via the USI the user is guided with the necessary actions to be performed to fix the failure;
in an event that repairing is not successful, generating a report describing the unrepaired malfunction and the symptoms of the unrepaired malfunction and sending the report of the unrepaired malfunction to a network operator, wherein the network operator provides internet service for the wireless device.

3. The method of claim 2, wherein said malfunction is repaired by means of automatic fix.

4. The method of claim 3, wherein said automatic fix comprises at least an instruction to allow for the automatic setting of at least one configurable parameter to its proper value.

5. The method of claim 1, wherein said configuration information comprises at least a list of values of configurable parameters associated with each wireless device.

6. The method of claim 5, wherein said configuration information further comprises a mapping of the computer wireless network utilizing topology data gathered for each of said wireless devices, wherein the topology data of each of the wireless devices comprises:
an Internet protocol (IP) address;
a network name; and
an operating system type of the wireless device.

7. The method of claim 5, wherein said wireless device comprises at least one of a printer, a personal computer, a personal digital assistant, a handheld computer, a notebook computer, a digital phone, and a printer.

8. The method of claim 1, wherein diagnosing said test rule further comprises comparing a predefined condition to said configuration information.

9. The method of claim 8, wherein said predefined condition determines at least a proper state of at least one configurable parameter.

10. The method of claim 9, wherein the comparison is performed by means of query language statements.

11. The method of claim 10, wherein said query language comprises at least one of standard query language, extensible markup language and plain text.

12. The method of claim 1, wherein said malfunction report is sent to technical personnel located at a remote site of a network operator.

13. The method of claim 12, wherein said malfunction report comprises at least a type of said malfunction and symptoms of said malfunction.

14. The method of claim 1, wherein said method is executed locally on one of the devices connected in said wireless network.

15. The method of claim 1, wherein said computer wireless network is operated in at least one of: a home, an airport, a business resource center, a food-service business, a shopping center.

16. The method of claim 1, wherein the computer wireless network further comprises at least one of a router, a switch, and a modem.

17. A computer program product for automatic diagnosis and resolution of at least one malfunction of a computer wireless network, said computer program product comprising software instructions for enabling a computer ystem to perform predetermined operations, and a computer readable medium bearing the software instructions; the predetermined operations comprising:
configuring automatically a wireless device with a set of particular parameters and settings of the wireless network upon a joining of said device to said wireless network, wherein the joining comprises:
providing at least one discovery request via a checkup agent;
receiving a selection of at least one discovery request via the wireless device;
responsive to the selection, the checkup agent utilizing a wireless discovery protocol via wireless signals;
obtaining a listing of available resources within a wireless communication area;
communicating the listing of available resources to the wireless device via the wireless device:
causing the wireless device to select at least one available resource;
detecting network configuration information for connecting to the selected resource;
collecting configuration information of said computer wireless network, wherein the computer wireless network comprises at least an access point and a plurality of wireless devices, and wherein the configuration information is collected for each wireless device;
diagnosing iteratively said collected configuration information with a set of test rules to determine if at least one of said test rules is satisfied; and
generating a malfunction report if at least one of said test rules is satisfied.

18. The computer program product of claim 17, wherein said method further comprises repairing the malfunction of a respective satisfied test rule, wherein the repairing is accomplished via a unified setting interface (USI).

19. The computer program product of claim 18, wherein said malfunction is repaired by means of automatic fix, wherein said automatic fix comprises a set of instructions allow the automatic setting of at least one configurable parameter to its proper value.

20. The computer program product of claim 17, wherein said configuration information comprises at least a list of values of configurable parameters associated with each wireless device.

21. The computer program product of claim 19, wherein said configuration information further comprises topology data gathered for each of said wireless devices, wherein the topology data of each of the wireless devices comprises:
at least one of an Internet protocol (IP) address;
a network name; and
an operating system type of the wireless device.

22. The computer program product of claim 20, wherein said wireless device comprises at least one of a beacon, a personal computer, a personal digital assistant, a handheld computer, a notebook computer, a digital phone, and a printer.

23. The computer program product of claim 20, wherein diagnosing said test rule further comprises comparing a predefined condition to said configuration information.

24. The computer program product of claim 20, wherein said predefined condition determines at least a proper state of at least one configurable parameter.

25. The computer program product of claim 24, wherein the comparison is performed by means of query language statements.

26. The computer program product of claim 25, wherein said query language comprises at least one of a standard query language, extensible markup language and plain text.

27. The computer program product of claim 17, wherein said malfunction report is sent to technical personnel located at a remote site of a network operator.

28. The computer program product of claim 27, wherein said malfunction report comprises at least the type of said malfunction and the symptoms of said malfunction.

29. The computer program product of claim 17, wherein said computer program product is executed locally on one of the devices connected in said wireless network.

30. The computer program product of claim 17, wherein said computer wireless network is operated in at least one of: a home, an airport, a business resource center, a food-service business, a shopping center.

31. The computer software product of claim 17, wherein the computer wireless network further comprises at least one of a router, a switch, and a modem.

32. A checkup apparatus for the purpose of automatic diagnosis and resolution of at least one malfunction of a computer wireless network, said apparatus comprising:
   means for automatically configuring a new wireless device with a set of particular parameters and settings of the wireless network upon a joining of said device to said wireless network, wherein the joining comprises:
      the means for automatically configuring a new wireless device providing at least one discovery request;
      receiving from the new wireless device a selection of one discovery request;
      responsive to the selecting, the means for automatically configuring a new wireless device utilizing a wireless discovery protocol via wireless signals;
   means for collection of configuration information of said computer wireless network wherein the computer wireless network comprises at least an access point and a plurality of wireless devices, and wherein the configuration information is collected for each wireless device;
   means for iterative diagnosis of said collected configuration information by application of a set of test rules, said means being further capable of determining if at least one of said test rules is satisfied; and
   means for generating a malfunction report if at least one of said test rules is satisfied.

33. The checkup apparatus of claim 32, wherein said checkup apparatus further comprises means for automatic repair of the malfunction of a respective satisfied test rule.

34. The checkup apparatus of claim 33, wherein said means for automatic repairing comprises a set of instructions allow the automatic selling of at least one configurable parameter to its proper value.

35. The checkup apparatus of claim 32, wherein said computer wireless network comprises at least one of a wireless local area network, a Bluetooth wireless network, an infrared data association network and 902.11 based wireless communication.

36. The checkup apparatus of claim 32, wherein each of said wireless devices comprises as least one of a personal computer, a personal digital assistant, a handheld computer, a notebook computer, a digital phone, and a printer.

37. The checkup of claim 32, wherein said configuration information comprises at least a list of values of configurable parameters associated with each device connected in said wireless network.

38. The checkup apparatus of claim 37, wherein said configuration information further comprises a mapping of the computer wireless network utilizing topology data gathered for each of said wireless devices, wherein the topology data of each of the wireless devices comprises:
   an Internet protocol (IP) address;
   a network name; and
   an operating system type of the wireless device.

39. The checkup apparatus of claim 38, wherein diagnosing said test rule further comprises comparing a predefined condition to said configuration information.

40. The checkup apparatus of claim 39, wherein said predefined condition determines at least a proper state of at least one configurable parameter.

41. The checkup apparatus of claim 39, wherein the comparison is performed by means of query language statements.

42. The checkup apparatus of claim 41, wherein said query language comprises at least one of a standard query language, extensible markup language and a plain text.

43. The checkup apparatus of claim 32, wherein said malfunction report is sent to technical personnel located at a remote site of a network operator.

44. The checkup apparatus of claim 43, wherein said malfunction report comprises at least the type of said malfunction and the symptoms of said malfunction.

45. The checkup apparatus of claim 32, wherein said checkup apparatus is installed in one of the devices connected in said wireless network.

46. The checkup apparatus of claim 32, wherein said computer wireless network is a digital home network, said digital home network comprises a plurality of home appliances connected though a communication media.

47. The checkup apparatus claim 46, wherein said communication media comprises at least one of a telephone line, a WLAN, a Bluetooth network, a USB network, an IEEE 1394 network and a power line.

48. The checkup apparatus of claim 32, wherein said computer wireless network is operated in at least one of: a home, an airport, a business resource center, a food-service business, a shopping center.

49. The checkup apparatus of claim 32, wherein the computer wireless network further comprises at least one of a router, a switch, and a modem.

* * * * *